May 19, 1953 H. N. LUBY ET AL 2,639,068
TOOL TRAY FOR VEHICLE BODIES OR THE LIKE
Filed Feb. 18, 1947 2 Sheets-Sheet 1
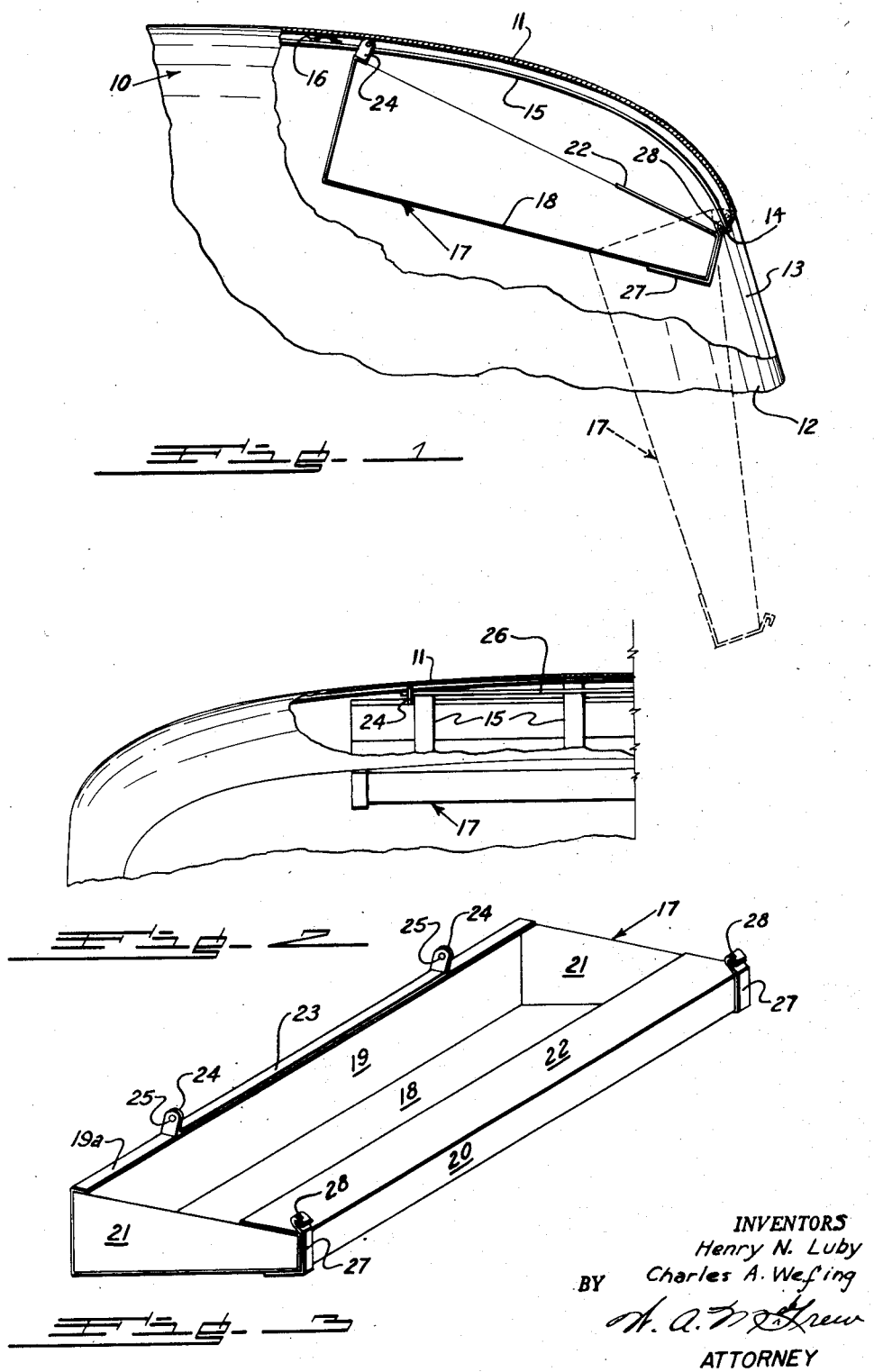
INVENTORS
Henry N. Luby
Charles A. Wefing
BY
ATTORNEY

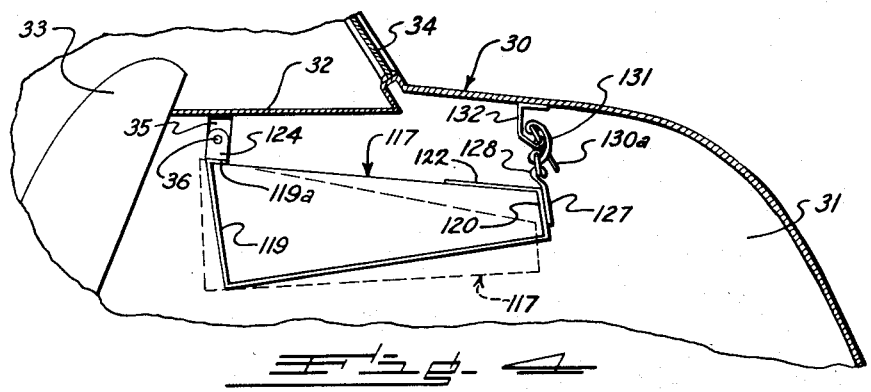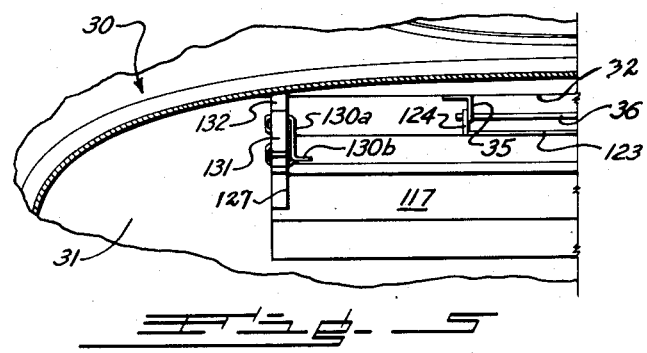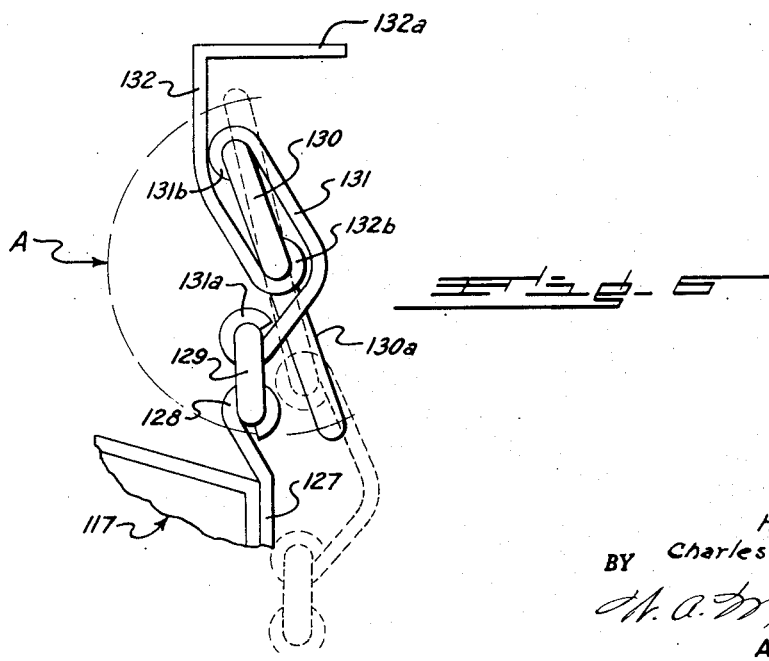

Patented May 19, 1953

2,639,068

UNITED STATES PATENT OFFICE 2,639,068

TOOL TRAY FOR VEHICLE BODIES
OR THE LIKE

Henry N. Luby and Charles A. Wefing,
Denver Colo.

Application February 18, 1947, Serial No. 729,340

3 Claims. (Cl. 224—42.1)

The present invention relates to a tool tray for vehicle bodies or the like. It has to do, particularly, although not exclusively, with an improved tool tray or tool-carrying tray for use in vehicle bodies in locations adjacent a door, deck lid, or other closure member, to permit easy and ready access to the tools, as well as to provide new and improved means for storing and carrying the tools in an out-of-the-way though convenient location.

Various types and kinds of tool carriers for motor vehicle bodies of both commercial and pleasure types have been provided but have had objectionable features and disadvantages which rendered them unsatisfactory and in some cases, impractical for use. At the present time, the usual or conventional tools which are furnished as standard equipment with a motor vehicle, are kept in a fabric kit which is intended to be carried in some usually out-of-the-way and often inaccessible place within the vehicle body. Frequently, such kits are located in inaccessible places within the vehicle body because of overcrowding of the storage compartment of the vehicle, and in some cases are lost or stolen. In any event, the tools for the vehicle are more than likely inaccessible when their use is required.

One of the objects of the present invention is to provide an improved tool-carrying tray which is of relatively simple construction, inexpensive to manufacture, and one which is capable of being so suspended or supported within the vehicle adjacent a door, deck, or other opening thereof, as to be always accessible to the person desiring to use the tools.

Another object of the invention is to provide an improved tool-carrying tray and improved means for movably supporting it from the roof structure or the rear deck panel of a vehicle so that it will be out of the way when not in use and yet capable of being moved quickly and easily to a position of use, when and if desired.

A further object of the present invention is to provide a new and novel combination with a vehicle body member or panel in the vicinity of a door opening, rear deck opening, or other opening of the body, of a new and improved tool-carrying tray which is adapted to be suspended in an out-of-the-way as well as out-of-use position, and which is capable of being moved from its suspended normal out-of-use position to a different suspended position of use; another object being to provide an improved tool-carrying tray per se, in which the tray is provided with an apron extending along a portion thereof to prevent the displacement of tools carried by the tray during the shifting of the tray from its out-of-use position to its position of use, or vice versa.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is a fragmentary side elevational view, partly in section and partly broken away, of the rear portion of a roof structure and the back and/or rear quarter panel of a vehicle body, such as a panel delivery truck, showing one application of the present invention thereto.

Fig. 2 is a fragmentary rear end elevational view, partly in section and partly broken away, of the structure shown in Fig. 1.

Fig. 3 is a perspective view of the tool tray, or tool-carrying tray shown in the preceding figures.

Fig. 4 is a fragmentary longitudinal sectional view partly in elevation, of a rear deck or compartment of a pleasure type automobile body, showing one application of the present invention thereto, and illustrating a somewhat modified form of tray.

Fig. 5 is a fragmentary transverse vertical sectional view, partly in elevation, of the structure shown in Fig. 4; and Fig. 6 is an enlarged fragmentary detail of the releasable and extensible linkage arrangement for supporting one side or portion of the tool-carrying tray shown in Figs. 4 and 5, in accordance with the present form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to Figs. 1, 2, and 3 of the drawings, there is shown in these figures one application of one form of tool tray or tool-carrying tray embodying the present invention and applied, merely by way of example, to the roof structure of a panel delivery truck body at the rear end of the roof structure where the roof panel merges with the rear end panel and side rear quarter panels of the body in the vicinity of the rear door opening in said body.

In Figs. 1 and 2, 10 represents, as a whole, the vehicle body, such as a panel delivery truck body, having a roof panel 11 and a rear panel 12, the latter being provided with a rear door opening 13. As shown, the metal of the panel 11 where it defines the upper portion of the door opening 13, may be turned inwardly and upwardly to provide a flanged portion 14, see Fig. 1. At spaced points and extending longitudinally on the under side of the roof panel 11, are trackways, guides, or strap-like members 15 which at their inner ends, are secured to the under surface of the roof panel in any suitable manner, as by welding, and which are spaced downwardly from the roof panel by means of spacer members 16. The opposite ends of the members 15 are secured in any suitable manner, as by welding, to the flanged portion 14. These trackways, guides, or spaced strap members 15 provide means for supporting and permitting the shifting movement from an elevated out-of-use position to a lowered position of use, of a tool tray or tool-carrying tray embodying the present invention, which tray is shown as a whole at 17 in Figs. 1 to 3, inclusive. The tray 17 is shown in its elevated and out-of-use position in full lines in Fig. 1 and in its lowered, or position of use in broken lines in Fig. 1.

The tray 17, as shown, is formed preferably from sheet metal, although it may be formed from any other suitable material, and comprises a bottom or base panel 18, an inner or rear side wall 19, an outer or front side wall 20 which is somewhat lower or shorter than the opposite side wall 19, and end walls 21, 21. As shown, the inner side wall 19 is extended forwardly to provide a relatively narrow flange or overhanging portion 19a and the opposite side wall 20 is likewise extended inwardly to provide a relatively wider flange or apron portion 22 which overlies the end walls 21 and a portion of the bottom wall 18, the two flanges being opposed to one another. It will be understood that the several panels or parts forming the tool-carrying tray 17 are all secured together in any suitable manner, as by welding, although rivets, bolts, or screws, as well as solder, may be used for securing the parts together to provide a unitary tray structure or assembly.

As shown in Fig. 3, the tray 17 has secured to its inwardly and forwardly directed flange 19a, a metal bar 23 having its opposite ends turned upwardly to provide ears of projecting portions 24. The ears and bar could, of course, be separate pieces secured together. These ears 24 are perforated at 25 to receive a round bar or elongated pin member 26, see Fig. 2. At its forward side edge adjacent the end walls 21, 21, the tray is provided with attached brackets or strap members 27 which, as shown, are in the form of angle irons and which have their upper free ends shaped to provide hook-like portions or members 28.

In assembling the tray 17 with the vehicle body, the bar or rod 26 is passed through the space between the strap members 15 and the roof panel 11 to span the space between the strap members, and the opposite ends of the bar are inserted in the apertures or openings 25 formed in the ears 24 of the tray member. Thus, the tray will be suspended at its inner side portion from the strap members or trackways 15. To maintain the tray in its elevated or out-of-use position, as shown in full lines in Fig. 1, the hook members 28 located at the forward side or edge of the tray are brought into engagement with the flanged portion 14 of panel 11, see Fig. 1.

When it is desired to gain access to the tools carried by the tray 17, the forward side or edge of the tray is elevated slightly to release the hook members 28 from engagement with the flange 14 to permit the tray to be lowered by sliding it forwardly and downwardly until it assumes approximately its position of use, in which position it is shown in broken lines, Fig. 1. During this lowering movement of the tray, the bar or rod 26 rides along the strap members or guides 15. With the tray in its lowered position, access to the tools therein may easily be had through the rear door opening 13 of the body. When it is desired to return the tray to its out-of-use position, it is simply elevated and moved along the guides or straps 15 to its full line position, with the hook members 28 again engaged with the flange 14.

By virtue of the novel structure described above and illustrated in Figs. 1 to 3, inclusive, of the drawings, the necessary tools may be carried in an out-of-the-way and inconspicuous position or location, while being readily accessible when needed.

In Figs. 4, 5, and 6 of the drawings a somewhat modified form of tool-carrying tray embodying the present invention is disclosed in one of its adaptations. In Figs. 4 and 5, there is shown as a whole at 30, a fragment of the rear end of a pleasure vehicle body, and particularly the rear deck compartment thereof. The rear deck compartment or storage space, indicated at 31, is provided with the usual rear deck lid (not shown) which serves to close the normal rear deck opening through which access to the space 31 may be had. It is desirable, with this type of vehicle body, to provide means for supporting the necessary tools in a position or location which will be readily accessible at all times, yet which is inconspicuous and which does not offer any unnecessary obstruction in the rear deck storage space which would thereby restrict the size or capacity of said space.

As seen in Fig. 4, there is located within the rear deck compartment 31, a tray for carrying tools, indicated as a whole at 117, which is substantially identical with the tray 17 of the preceding views. This tray, as shown, has a flange portion 119a at the upper edge of its inner side wall 119 which supports a pair of spaced upstanding members or ears 124, corresponding to the ears 24 of the preceding form of the invention. These ears may be attached to the flange 119a by welding or they may be formed at the ends of a bar 123 (see Fig. 5) and in these respects be similar to the parts 23, 24 of the preceding form of the invention. The ears 124, as shown, are perforated to receive the ends of a pivot bar or elongated pin 36 which extends through perforations in the depending angle brackets 35 fixedly attached to the under side of panel 32. The tray also has an apron portion 122. This structure is best seen in Fig. 5 of the drawings.

The forward side or portion of the tray 117, namely the shorter upright wall 120 thereof, carries adjacent its opposite ends, bracket members 127 which are secured to the wall 120 in any suitable manner, as by welding. The upper ends of the members 127 are in the form of closed hook-like portions or loops 128 each of which receives and supports a link 129. It will be understood that one such closed hook member 128 is disposed at each end of the forward or shorter side wall 120 of the tray.

The rear deck panel, as shown, carries a pair of spaced depending brackets or support members 132 which are held to the panel in any suitable manner, as by welding the base portion 132a of each member to the inner side of the panel. The lower end portion of each bracket 132 is in the form of a closed, or substantially closed hook or loop 132b which supports a somewhat larger link member 130. The link member 130, as shown in Fig. 5, has a downwardly extending portion 130a terminating in an inwardly directed free end portion 130b, see Fig. 5, which latter portion provides, in effect, an operating handle or crank for the link 130.

As best seen in Fig. 6, the links 129 and 130 are interconnected by means of a metal strap member or connecting link 131, the opposite ends of which are substantially closed as shown at 131a and 131b and which grip, respectively, the links 129 and 130. The member 131 completes the linkage assemblies between the fixed brackets 132 and the tool-carrying tray 117.

With the parts as shown in full lines, Figs. 4 and 6, it is to be observed that the tool-carrying tray 117 is in its elevated or out-of-use position. When, however, the cranks 130b of the linkage connections or tray-suspending means are moved in accordance with the arc indicated at A in Fig. 6, the tray 117 is lowered from its full line position to its broken line position of Fig. 4, in which latter position the tools within the tray are readily accessible through the rear deck opening.

It is to be understood that the present invention, insofar as the suspending or supporting means of Figs. 4 to 6, inclusive, is concerned, is not limited to the use of the particular adjustable linkage means illustrated in Fig. 6. Other suitable means may be provided for this purpose, so long as it is possible to lower the tray 117 from its out-of-use position to its position of use, with the tray being maintained in either of these positions against accidental displacement from such positions.

As is well known, it is desirable to have as much available space as is possible within the rear deck compartment of a motor vehicle body. By virtue of the fact that the tray 117 of Figs. 4 to 6, inclusive, may be elevated to a position closely adjacent the upper portion of the deck compartment when not in use, more articles, such as luggage, may be stored within the compartment.

Having thus described the invention, what is claimed is:

1. In combination with a vehicle body roof panel in which the body has a rear door opening and a door for closing said opening, a pair of trackways extending in spaced relationship lengthwise of the roof panel throughout a portion of its length and terminating at the upper end of the door opening in the body, said panel having an inwardly and upwardly projecting flange defining the upper edge of the door opening, of a tool tray having at its inner side spaced means slidably engaged in said trackways, and hook-like members located at its outer side and engageable with said flange for maintaining the tray in its out-of-use position beneath the roof panel, said tray being capable of sliding movement along said trackways to a position of use within said door opening upon release of said hook-like members from said flange.

2. A combination according to claim 1, wherein said spaced means are in the form of perforated ears upstanding from said tray, and wherein a rod spans the space between and is in movable contact with said trackways and has its end portions engaged in the perforations of said ears.

3. A combination according to claim 1, wherein the tool tray has a closed bottom, sides, and ends and an open top, together with an apron extending inwardly from the outer side wall of the tray to provide a cover for that portion of the open top adjacent said outer side wall.

HENRY N. LUBY.
CHARLES A. WEFING.

References Cited in the file of this patent

UNITED STATES PATENTS

| Number | Name | Date |
|---|---|---|
| 337,903 | Waste | Mar. 16, 1886 |
| 1,368,432 | Hahn | Feb. 15, 1921 |
| 1,498,661 | Kyle | June 24, 1924 |
| 1,659,929 | Trout | Feb. 21, 1928 |
| 1,711,784 | Hieber | May 7, 1929 |
| 2,091,071 | Girl | Aug. 24, 1937 |
| 2,219,076 | Marzilli | Oct. 22, 1940 |
| 2,278,011 | Murdock | Mar. 31, 1942 |
| 2,320,856 | Ehlers | June 1, 1943 |
| 2,483,478 | Smelker | Oct. 4, 1949 |

FOREIGN PATENTS

| Number | Country | Date |
|---|---|---|
| 147,296 | Switzerland | Aug. 1, 1931 |